US009523425B2

(12) United States Patent
Inagaki et al.

(10) Patent No.: US 9,523,425 B2
(45) Date of Patent: Dec. 20, 2016

(54) HYDRAULIC CONTROL UNIT

(75) Inventors: Takafumi Inagaki, Susono (JP); Yuji Hattori, Gotenba (JP); Tomokazu Inagawa, Susono (JP); Kenta Kimura, Susono (JP); Yu Nagasato, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 92 days.

(21) Appl. No.: 14/405,199

(22) PCT Filed: Jun. 8, 2012

(86) PCT No.: PCT/JP2012/064797
§ 371 (c)(1),
(2), (4) Date: Dec. 3, 2014

(87) PCT Pub. No.: WO2013/183162
PCT Pub. Date: Dec. 12, 2013

(65) Prior Publication Data
US 2015/0144207 A1    May 28, 2015

(51) Int. Cl.
*F16H 61/00* (2006.01)
*F16H 61/02* (2006.01)
(Continued)

(52) U.S. Cl.
CPC .......... *F16H 61/0251* (2013.01); *F16H 61/00* (2013.01); *F16H 61/143* (2013.01);
(Continued)

(58) Field of Classification Search
CPC . F16H 61/0251; F16H 61/00; Y10T 137/7768
(Continued)

(56) References Cited

U.S. PATENT DOCUMENTS

| 4,673,162 A * | 6/1987 | Lachmann | ............ F16K 31/383 137/614.11 |
| 5,161,777 A * | 11/1992 | Kawasaki | ............... G05D 7/005 137/486 |
| 6,237,635 B1 * | 5/2001 | Nambu | .................. F16K 31/124 137/487.5 |

FOREIGN PATENT DOCUMENTS

| JP | 2010-266034 A | 11/2010 |
| JP | 2011-163393 A | 8/2011 |
| WO | 2013108352 A1 | 7/2013 |

* cited by examiner

*Primary Examiner* — Michael R Reid
*Assistant Examiner* — Paul J Gray
(74) *Attorney, Agent, or Firm* — Andrews Kurth Kenyon LLP

(57) ABSTRACT

A hydraulic control unit is provided. A valve is comprised of a piston having a valve element, a cylinder holding the piston while allowing to reciprocate axially, a positive pressure chamber formed on one side of the piston to which pressure to open the valve is applied, a back pressure chamber formed on the other side of the piston to which the pressure to close the valve is applied, and a connection passage for differentiating pressures in the positive pressure chamber and the back pressure chamber. A pilot valve selectively connects the back pressure chamber with a site where the pressure is lower than that of the back pressure chamber. Hydraulic pressure lower than that applied to positive pressure chamber is applied to a low pressure section. The hydraulic control unit comprises a means to deliver the fluid from the low pressure section to the back pressure chamber if an opening motion of the valve is slower than a predetermined reference value, by opening the pilot valve to connect the back pressure chamber with the low pressure section.

8 Claims, 4 Drawing Sheets

(51) Int. Cl.
  *F16H 61/14*    (2006.01)
  *F16H 61/662*   (2006.01)
(52) U.S. Cl.
  CPC ..... *B60Y 2400/72* (2013.01); *F16H 61/66259* (2013.01); *F16H 61/66272* (2013.01); *F16H 2061/0253* (2013.01); *F16H 2061/145* (2013.01); *Y10T 137/7761* (2015.04)
(58) Field of Classification Search
  USPC .............................. 137/487.5, 489.5; 474/28
  See application file for complete search history.

HYDRAULIC CONTROL UNIT

CROSS-REFERENCE TO RELATED APPLICATION

This is a national phase application based on the PCT International Patent Application No. PCT/JP2012/064797 filed Jun. 8, 2012, the entire contents of which are incorporated herein by reference.

TECHNICAL FIELD

The present invention relates to a hydraulic control unit provided with a balance piston valve, in which a positive pressure chamber and a back pressure chamber are formed across a piston, and in which the piston is actuated according to a pressure deference between the positive pressure chamber and the back pressure chamber to open or close the valve.

BACKGROUND ART

In general, a speed ratio, a torque capacity and so on of a vehicular transmission is changed hydraulically. For example, a control unit for a belt-driven continuously variable transmission is described in Japanese Patent Laid-Open No. 2011-163393. The control unit is comprised of a pressure delivery valve for delivering an oil pressure to an oil chamber of a drive pulley, a pressure drain valve for draining an oil pressure from the oil chamber, a pressure delivery valve for delivering an oil pressure to an oil chamber of a driven pulley, and a pressure drain valve for draining an oil pressure from the oil chamber. Specifically, a poppet valve actuated by a magnetic solenoid is used as those valves. Each valve is individually comprised of a valve element having a tapered or semispherical nose portion, a valve seat to which the valve element is contacted, a plunger attached to the valve element, a spring for pushing the valve element onto the valve seat, and an electromagnetic coil for pulling the plunger from the valve seat against an elastic force of the spring. An input port is formed in the valve seat, and an output port is formed at a site where the valve element is situated. The input port of each valve is closed by pushing the valve element onto the valve seat by the elastic force of the spring. By contrast, the input port of each valve is opened by isolating the valve element away from the valve seat against the elastic force of the spring by the electromagnetic force of the electromagnetic coil, thereby providing a communication between the input port and the output port.

Japanese Patent Laid-Open No. 2010-266034 describes a controller for continuously variable transmission comprised of a supply valve for supplying a hydraulic fluid to an oil chamber of a primary pulley, and a supply solenoid for applying a pilot pressure to the supply valve, a discharge valve for draining the fluid from the oil chamber, and a discharge solenoid for applying a pilot pressure to the discharge valve. According to the teachings of Japanese Patent Laid-Open No. 2010-266034, the supply valve is comprised of a casing, a spool having an after mentioned valve portion held in the casing, and a spring elastically moving the spool. On the casing, there are formed an inlet port to a line pressure is applied, pilot ports to which the pilot pressure is applied, and an outlet port communicated to an oil chamber of a secondary pulley. Accordingly, the pilot pressure is applied to the spool against the elastic force of the spring. The supply valve taught by Japanese Patent Laid-Open No. 2010-266034 is adapted to provide a communication between the inlet port and the outlet port by pushing the valve portion while compressing the spring by the pilot pressure delivered from the supply valve. Given that the communication between the inlet port and the outlet port is provided, the hydraulic fluid is allowed to flow into to the hydraulic chamber of the primary pulley. By contrast, given that the pilot pressure is not delivered from the supply valve, the valve portion is moved by the elastic force of the spring to cut off the communication between the inlet port and the outlet port. In this situation, delivery of the fluid to the hydraulic chamber of the primary pulley is cutoff. Thus, the supply valve taught by Japanese Patent Laid-Open No. 2010-266034 is adapted to selectively deliver the fluid to the oil chamber of the primary pulley by altering a position of the valve portion by controlling the deliver valve.

As described, the control unit taught by Japanese Patent Laid-Open No. 2011-163393 is configured to directly open and close the port communicated with the oil chamber by the valve element actuated by the electromagnetic force and the elastic force of the spring. To this end, a high pressure in the oil chamber is directly applied to the valve element. Therefore, a large elastic force of the spring against the high oil pressure is required to keep the valve closing, and the solenoid has to generate a sufficient electromagnetic force to move the valve element in an opening direction against the elastic force of the spring. For this reason, a larger spring and a larger solenoid are required to counteract the pressure in the oil chamber thereby enlarging a size of the control system. In addition, a larger electricity is required to open the valve.

As also described, the controller taught by Japanese Patent Laid-Open No. 2010-266034 is configured to control the delivery and drainage of the oil pressure to/from the oil chamber by the spool valve. That is, oil leakage from the spool valve is worsened with a rise in the oil pressure in the hydraulic chamber. For this reason, an energy loss may be increased.

In order to deal with the disadvantages contained in the teachings of the above explained prior art documents, adaption of a balance piston valve may be effective. In the balance piston valve, a valve element integrated with a piston is actuated by a pressure deference between the positive hydraulic chamber and the back pressure chamber. However, a differential pressure may be decreased depending on an expansion and a contraction of air intruding into the oil in the back pressure chamber. Consequently, an opening response of the valve element may be worsened, that is, a control response may be worsened.

DISCLOSURE OF THE INVENTION

In order to solve the foregoing technical problems, it is therefore an object of this invention to improve a control response of a hydraulic control unit having a balance piston valve.

The hydraulic control unit of the present invention is comprised of: a valve comprised of a piston integrated with a valve element, a cylinder holding the piston while allowing to reciprocate axially, a positive pressure chamber which is formed on one side of the piston and to which hydraulic pressure to open the valve is applied, a back pressure chamber which is formed on the other side of the piston and to which the hydraulic pressure to close the valve is applied, and a connection passage having a function to differentiate hydraulic pressures in the positive pressure chamber and the back pressure chamber; a pilot valve that selectively connects the back pressure chamber with a site where the pressure is lower than that of the back pressure chamber; and a low pressure section to which the hydraulic pressure lower than that applied to positive pressure chamber is applied. In order to achieve the above-explained objective, according to the present invention, the hydraulic control unit is provide with a means configured to deliver hydraulic fluid from the low pressure section to the back pressure chamber if an opening motion of the valve is slower than a predetermined reference value, by opening the pilot valve to connect the back pressure chamber with the low pressure section.

The hydraulic control unit of the present invention is comprised of a prime mover. The aforementioned means may be configured to deliver the hydraulic fluid from the low pressure section to the back pressure chamber if the prime mover is started, by opening the pilot valve to connect the back pressure chamber with the low pressure section.

Specifically, the pilot valve is adapted to selectively connect a pilot port of the back pressure chamber with the site where the pressure is lower. In addition, the hydraulic control unit is further comprised of: a bypass passage that directly connects the back pressure chamber to the low pressure section, and whose cross-sectional area is larger than that of a portion of the connection passage to differentiate the hydraulic pressures; and a switching valve that is disposed on the bypass passage to selectively connect the bypass passage with the low pressure section. The aforementioned may be configured to connect the bypass passage with the low pressure section to deliver the hydraulic fluid from the low pressure section to the back pressure chamber if the opening motion of the valve is slower than the predetermined reference value, by opening pilot valve while operating the switching valve.

The positive pressure chamber is comprised of an input port to which the fluid to open the valve is delivered, and an output port which is closed by the valve element. In addition, the switching valve is disposed between a hydraulic chamber of a pulley of a belt-driven continuously variable transmission and a hydraulic source, and the output port is connected with the hydraulic chamber.

Thus, according to the hydraulic control unit of the present invention, if a hydraulic response to open the valve is slower than the predetermined reference value due to air intrusion in the back pressure chamber, the pilot valve is energized to be opened so that the back pressure chamber is connected with the low pressure section thereby delivering the hydraulic fluid from the low pressure section to the back pressure chamber. Consequently, the air is pushed of the back pressure chamber by the hydraulic fluid, and the fluid is then flows toward the low pressure site. According to the present invention, therefore, the air can be discharged from the back pressure chamber while filling the back pressure chamber with the hydraulic fluid even if the back pressure chamber is not filled fully with the hydraulic fluid. For this reason, a delay in the opening motion of the valve resulting from air intrusion into the back pressure chamber can be prevented so that a control response of the hydraulic control system having the balance piston type valve can be improved.

Specifically, the hydraulic control unit is configured to deliver the hydraulic fluid to from the low pressure section to the back pressure chamber upon starting of the prime mover. Therefore, even if the hydraulic control unit remains unused for a long period of time and the air intrudes into the back pressure chamber, such air can be discharged by the fluid while filling the back pressure chamber with the fluid when starting the engine. Thus, the response delay of the valve can be prevented even if the hydraulic control unit has not been actuated for a long period of time. In addition, the valve can be prevented from opening abruptly.

As described, the bypass passage having a cross-sectional area larger than that of the connection passage provides a direct communication between the back pressure chamber to the low pressure section. Therefore, the hydraulic fluid is allowed to be delivered from the low pressure section in large amount. In addition, as mentioned above, the air can be pushed out of the back pressure chamber by the hydraulic fluid while filling the back pressure chamber with the hydraulic fluid.

The hydraulic control unit of the present invention may be applied to a belt-driven continuously variable transmission to control hydraulic pressure applied to the pulleys. In this case, energy efficiency of the belt-driven continuously variable transmission can be improved by preventing a leakage of highly pressurized fluid.

DESCRIPTION OF PREFERRED
EMBODIMENT(S)

Figure 1:
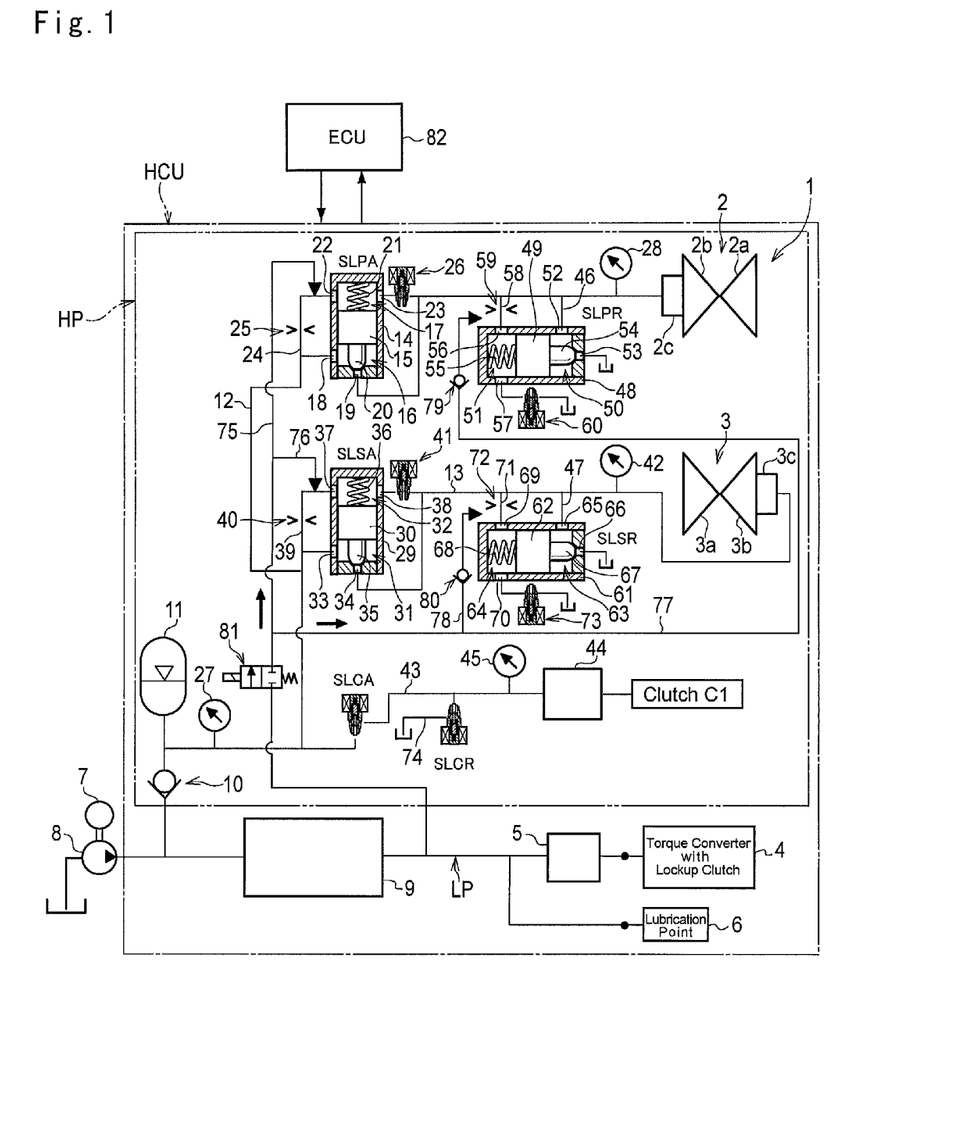
FIG. 1 is a view schematically illustrating one example of the hydraulic control unit according to the present invention.

The hydraulic control unit HCU of the present invention may be applied not only to a transportation carrier such as an automobile and an air craft but also to a various kinds stationary industrial machineries. FIG. 1 shows a preferred example of applying the hydraulic control unit HCU to a conventional belt-driven continuously variable transmission 1 widely used in automobiles. A structure of the continuously variable transmission 1 will be briefly explained hereinafter. The continuously variable transmission 1 is comprised of a drive pulley 2 and a driven pulley 3. Specifically, the drive pulley 2 is comprised of a fixed sheave 2a and a movable sheave 2b allowed to reciprocate toward and away from the fixed sheave 2a, and a V-groove is formed between those sheaves 2a and 2b. Likewise, the driven pulley 3 is comprised of a fixed sheave 3a and a movable sheave 3b allowed to reciprocate toward and away from the fixed sheave 3a, and a V-groove is formed between those sheaves 3a and 3b. In order to transmit torque between those pulleys 2 and 3, a not shown drive belt is held in the V-grooves of those pulleys. Accordingly, a speed ratio of the continuously variable transmission 1 can be varied continuously by altering a running radius of the drive belt. To this end, the drive pulley 2 is provided with a hydraulic chamber 2c to axially reciprocate the movable sheave 2b, and the driven pulley 3 is provided with a hydraulic chamber 3c to axially reciprocate the movable sheave 3b. According to the preferred example, a hydraulic pressure for altering the belt running radius to change a speed ratio is applied to the hydraulic chamber 2c, and a hydraulic pressure for clamping the drive belt by the pulleys 2 and 3 is applied to the hydraulic chamber 3c.

A clutch C1 is arranged to selectively deliver torque to an input side or an output side of the continuously variable transmission 1. For example, a wet-type multiple plate clutch is used as the clutch C1, and a torque transmitting capacity of the clutch C1 is changed according to the hydraulic pressure applied thereto. Specifically, hydraulic pressure to achieve a required torque capacity to propel the vehicle is applied to the continuously variable transmission 1 and the clutch C1. To this end, relatively high pressures to transmit the torque are applied to the hydraulic chambers 2c, 3c, and the clutch C1. A section to which the relatively high pressure is applied and a hydraulic circuit for delivering such high pressure will be called the "high pressure section HP" in the following explanation, and the hydraulic pressure applied to the high pressure section HP is relatively higher than the hydraulic pressure applied to an after-mentioned "low pressure section LP".

Although not illustrated in detail, a conventional torque converter 4 having a lockup clutch is arranged in a power transmission system including the continuously variable transmission 1. The torque converter 4 is adapted to mechanically connect an input member and an output member of the lockup clutch 4 by engaging the lockup clutch. In practice, the lockup clutch 4 is selectively engaged hydraulically depending on a running condition of the vehicle such as a vehicle speed, an engine speed and so on. Specifically, the lockup clutch 4 is selectively engaged by applying a control pressure from a lockup control valve 5. To this end, the lockup control valve 5 is adapted to output the control pressure in accordance with a signal pressure. Therefore, the lockup control valve 5 is actuated by a relatively lower pressure in comparison with the hydraulic chambers 2c, 3c, and the clutch C1.

In the power transmission system having the continuously variable transmission 1 and the torque converter 4, a lubricant is applied to sites of friction, slide members such as a bearing, and heat-generating members. For this purpose, it is unnecessary to pressurize the hydraulic fluid but necessary to deliver required amount of lubricant to those sites. Accordingly, the lubrication site 6, the lockup control valve 5, the torque converter 4, and a hydraulic circuit for delivering a low-pressure fluid form the low pressure section LP.

Next, here will be explained a structure for applying hydraulic pressure to the hydraulic chambers 2c, 3C, and the clutch C1. In the preferred example shown in FIG. 1, there is provided an oil pump 8 driven by a prime mover 7. For example, an internal combustion engine such as a gasoline engine, an electric motor, and a hybrid drive unit comprised of the engine and the motor may be used as the prime mover 7. In the following explanation, the prime mover 7 will simply be called the "engine" 7. A primary regulator valve 9 is disposed to regulate a pressure level of the hydraulic fluid discharged from the oil pump 8, and the lockup control valve 5 and the lubrication site 6 are situated downstream of the primary regulator valve 9. Thus, the hydraulic fluid depressurized by the primary regulator valve 9 is delivered to the low pressure section LP.

A discharging outlet of the oil pump 8 is connected to an accumulator 11 through a check valve 10. Specifically, the check valve 10 is a one-way valve that is opened by the fluid flowing from the oil pump 8 toward the accumulator 11, and closed by the fluid flowing in the opposite direction. Although not shown, the accumulator 11 is adapted to store the fluid pressurized higher than a predetermined pressure, and to deliver the fluid to the high pressure section HP.

A balance piston type feeding valve SLPA is disposed on a feeding passage 12 for delivering the fluid from the accumulator 11 to the hydraulic chamber 2c of the drive pulley 2. The balance piston valve is actuated by a pressure difference between an input pressure and a back pressure across a piston. Therefore, a delivery of the fluid to the hydraulic chamber 2c through the feeding passage 12 is allowed and stopped by selectively opening the feeding valve SLPA by a pressure difference between both sides of the feeding valve SLPA. Also, a balance piston type feeding valve SLSA is disposed on a feeding passage 13 for delivering the fluid from the accumulator 11 to the hydraulic chamber 3c of the drive pulley 3. Therefore, a delivery of the fluid to the hydraulic chamber 3c through the feeding passage 13 is allowed and stopped by selectively opening the feeding valve SLSA by a pressure difference between both sides of the feeding valve SLSA.

The feeding valve SLPA is comprised of a liquid-tight cylinder 14, and a piston 15 reciprocating within the cylinder 14. Therefore, a positive pressure chamber 16 and a back pressure chamber 17 are formed on both sides of the piston 15. The positive pressure chamber 16 is comprised of an input port 18 to which the fluid is delivered from the oil pump 8 and the accumulator 11, and an output port 19 for draining the fluid from the positive pressure chamber 16. The output port 19 is communicated with the hydraulic chamber 2c. In order to close the output port 19, a valve element 20 protrudes from a center portion of the piston 15 toward the positive pressure chamber 16. To this end, according to the preferred example shown in FIG. 1, the valve element 20 is provided with a hemispherical leading end whose diameter is larger than an inner diameter of the output port 19. Therefore, the output port 19 is closed by pushing the leading end of the valve element 20 thereto.

The back pressure chamber 17 is comprised of a back pressure port 22 and a pilot port 23, and a spring 21 is arranged in the back pressure chamber 17 so as to elastically push the piston 15 toward the positive pressure chamber 16. According to the preferred example shown in FIG. 1, the back-pressure port 22 and the pilot port 23 are formed on both sides of the back pressure chamber 17, and a connection passage 24 provides a communication between the input port 18 and the back-pressure port 22. In order to create a pressure difference between the positive pressure chamber 16 and the back pressure chamber 17, a control orifice 25 is formed on the connection passage 24 to reduce an inner diameter of the connection passage 24. Alternatively, a pressure difference between the positive pressure chamber 16 and the back pressure chamber 17 may also be created by forming a communication hole penetrating through the piston 15 to provide a communication between those chambers.

A pressure intensifier pilot valve 26 is connected to the pilot port 23 of the feeding valve SLPA to selectively provide a communication between the pilot port 23 and a site where a pressure is lower than that in the back pressure chamber 17. For example, a solenoid valve that is controlled electrically may be used as the pilot valve 26. In the pilot valve 26, therefore, a communication between an inlet port and outlet port is provided by energizing a solenoid, and a communication between those ports is interrupted by unenergizing the solenoid. The inlet port of the pilot valve 26 is connected to the pilot port 23. According to the example shown in FIG. 1, pressure in the hydraulic chamber 2c of the drive pulley 2 is lower than that in the back pressure chamber 17, therefore, the outlet port of the pilot valve 26 is connected to the hydraulic chamber 2c. In addition, an input pressure sensor 27 is arranged to detect pressure of the fluid delivered from the accumulator 11, and a control pressure sensor 28 is arranged to detect pressure in the hydraulic chamber 2c.

The feeding valve SLSA is adapted to allow a delivery of the fluid to the hydraulic chamber 3c of the driven pulley 3. To this end, the feeding valve SLSA is comprised of a liquid-tight cylinder 29, and a piston 30 reciprocating within the cylinder 29. Therefore, a positive pressure chamber 31 and a back pressure chamber 32 are formed on both sides of the piston 30. The positive pressure chamber 31 is comprised of an input port 33 to which the fluid is delivered from the oil pump 8 and the accumulator 11, and an output port 34 for draining the fluid from the positive pressure chamber 31. The output port 34 is communicated with the hydraulic chamber 3c. In order to close the output port 34, a valve element 35 protrudes from a center portion of the piston 30 toward the positive pressure chamber 31. To this end, according to the preferred example shown in FIG. 1, the valve element 35 is provided with a hemispherical leading end whose diameter is larger than an inner diameter of the output port 34. Therefore, the output port 34 is closed by pushing the leading end of the valve element 35 thereto.

The back pressure chamber 32 is comprised of a back pressure port 37 and a pilot port 38, and a spring 36 is arranged in the back pressure chamber 32 so as to elastically push the piston 30 toward the positive pressure chamber 31. According to the preferred example shown in FIG. 1, the back pressure port 37 and the pilot port 38 are formed on both sides of the back pressure chamber 32, and a connection passage 39 provides a communication between the input port 33 and the back-pressure port 37. In order to reduce an inner diameter of the connection passage 39, a control orifice 40 is formed on the connection passage 39.

A pressure intensifier pilot valve 41 is connected to the pilot port 38 of the feeding valve SLSA to selectively provide a communication between the pilot port 38 and a site where a pressure is lower than that in the back pressure chamber 32. For example, a solenoid valve that is controlled electrically may also be used as the pilot valve 41. In the pilot valve 41, therefore, a communication between an inlet port and outlet port is provided by energizing a solenoid, and a communication between those ports is interrupted by unenergizing the solenoid. The inlet port of the pilot valve 41 is connected to the pilot port 38, and the outlet port of the pilot valve 41 is connected to the hydraulic chamber 3c. In addition, a control pressure sensor 42 is arranged to detect pressure in the hydraulic chamber 3c.

A feeding solenoid valve SLCA is disposed on a feeding passage 43 for delivering the fluid from the accumulator 11 to the clutch C1. Although not shown in detail, an electromagnetic poppet valve may be used as the feeding solenoid valve SLCA. Therefore, a delivery of the fluid to the clutch C1 is through the feeding passage 43 is allowed and stopped by electrically opening and closing the feeding valve SLCA.

A manual valve 44 is disposed to selectively allow a delivery of the fluid to the clutch C1 and to a not shown brake B1. That is, the manual valve 44 is adapted to switch a delivery destination of the fluid. Although not shown in detail, a forward stage of the vehicle is established by engaging the clutch C1 by delivering the fluid thereto, while disengaging the brake B1 by stopping the fluid supply thereto. By contrast, a reverse stage of the vehicle is established by disengaging the clutch C1 by stopping the fluid supply thereto, while engaging the brake B1 by delivering fluid thereto. In order to detect the hydraulic pressure applied to the clutch C1, there is arranged an input pressure sensor 45.

A balance piston type drain valve SLPR is disposed on a drain passage 46 providing a communication between a hydraulic chamber 2C of the drive pulley 2 and a drain spot such as an oil pan, and a balance piston type drain valve SLSR is disposed on a drain passage 47 for draining the fluid from the hydraulic chamber 3c of the driven pulley 3. That is, the fluid is allowed and inhibited to drain from the hydraulic chamber 2C, 3C by selectively opening the drain passages 46, 47 depending on a pressure difference between both sides of the piston of the drain valve SLPR, SLSR.

The drain valve SLPR is comprised of a liquid-tight cylinder 48 and a piston 49 reciprocating within the cylinder 48. Therefore, a positive pressure chamber 50 and a back pressure chamber 51 are formed on both sides of the piston 49. The positive pressure chamber 50 is comprised of an input port 52 to which the hydraulic pressure is delivered from the hydraulic chamber 2c, and an output port 53 which is connected to a drain spot to drain the fluid from the positive pressure chamber 50.

A valve element 54 protrudes from the piston 49, and a spring 55 is disposed in the back pressure chamber 51 to elastically push the valve element 54 toward the positive pressure chamber 50 thereby closing the output port 53. The back pressure chamber 51 is comprised of a back pressure port 56 and a pilot port 57. In the example shown in FIG. 1, the back pressure port 56 is being opposed to the pilot port 57 across the back pressure chamber 51, and the back pressure port 56 and the input port 52 are connected through a connection passage 58. In order to reduce an inner diameter of the connection passage 58, a control orifice 59 is formed on the connection passage 58.

The pilot port 57 is connected with a depressurization pilot valve 60. For instance, a solenoid valve which is electrically actuated may be used as the depressurization pilot valve 60. In the pilot valve 60, therefore, a communication between an inlet port and outlet port is provided by energizing a solenoid, and a communication between those ports is interrupted by unenergizing the solenoid. The inlet port of the pilot valve 60 is connected to the pilot port 57, and the outlet port of the pilot valve 60 is connected to the drain spot.

The drain valve SLSR is also comprised of a liquid-tight cylinder 61 and a piston 62 reciprocating within the cylinder 61. Therefore, a positive pressure chamber 63 and a back pressure chamber 64 are formed on both sides of the piston 62. The positive pressure chamber 63 is comprised of an input port 65 to which the hydraulic pressure is delivered from the hydraulic chamber 3c, and an output port 66 which is connected to a drain spot to drain the fluid from the positive pressure chamber 63.

A valve element 67 protrudes from the piston 62, and a spring 68 is disposed in the back pressure chamber 64 to elastically push the valve element 67 toward the positive pressure chamber 64 thereby closing the output port 66. The back pressure chamber 64 is comprised of a back pressure port 69 and a pilot port 70. In the example shown in FIG. 1, the back pressure port 69 is being opposed to the pilot port 70 across the back pressure chamber 64, and the back pressure port 69 and the input port 65 are connected through a connection passage 71. In order to reduce an inner diameter of the connection passage 71, a control orifice 72 is formed on the connection passage 71.

The pilot port 70 is connected with a depressurization pilot valve 73. For instance, a solenoid valve which is electrically actuated may be used as the depressurization pilot valve 73. In the pilot valve 73, therefore, a communication between an inlet port and outlet port is provided by energizing a solenoid, and a communication between those ports is interrupted by unenergizing the solenoid. The inlet port of the pilot valve 73 is connected to the pilot port 70, and the outlet port of the pilot valve 73 is connected to the drain spot.

An electromagnetic drain valve SLCR is disposed on a drain passage 74 for draining the fluid from the clutch C1. A structure of the electromagnetic drain valve SLCR is similar to that of the feeding solenoid valve SLCA. Specifically, the electromagnetic drain valve SLCR is electrically actuated to open and close the feeding passage 74 to selectively allows the fluid to drain from the clutch C1.

A bypass passage 75 is formed to deliver the fluid from the low pressure section LP to the back pressure chamber 17. One of end portions of the bypass passage 75 is connected to the low pressure section LP, and other end portion is connected to the back pressure port 22 of the feeding valve SLPA or a portion of the connection passage 24 between the control orifice 25 and the back pressure chamber 17. In the example shown in FIG. 1, a bypass passage 76 is branched out from the bypass passage 75 to be connected to the back pressure port 37 of the feeding valve SLSA or to a portion of the connection passage 39 between the control orifice 40 and the back pressure chamber 32. A bypass passage 77 is branched out from the bypass passage 75 to be connected to the back pressure port 56 of the drain valve SLPR or to a portion of the connection passage 58 between the control orifice 59 and the back pressure chamber 51. Further, a bypass passage 78 is branched out from the bypass passage 77 to be connected to the back pressure port 69 of the drain valve SLSR or to a portion of the connection passage 71 between the control orifice 72 and the back pressure chamber 64. A cross-sectional area of each bypass passage 75, 76, 77 and 78 is individually larger than those of control orifices 25, 40, 59 and 72.

A check valve 79 is disposed on the bypass passage 77, and a check valve 80 is disposed on the bypass passage 78. A one-way valve is also used individually as the check valves 79 and 80. Therefore, the check valves 79 and 80 are opened by the fluid flowing from the low pressure section LP toward back pressure chamber 51 or 64, and closed by the fluid flowing in the opposite direction.

As shown in FIG. 1, a switching valve 81 is disposed on the bypass passage 78. For example, an electrically controlled solenoid valve that is opened by applying current and closed by interrupting current is used as the switching valve 81. Therefore, a communication between each back pressure chamber 17, 32, 51 and 64 and the low pressure section LP through the bypass passage 75, 76, 77 and 78 is provided by opening the switching valve 81 by supplying the current thereto. In the following description, the opening state of the switching valve 81 will also be called an "ON-state". Alternatively, a valve whose opening degree is adjustable, a valve whose flow rate is adjustable, and a duty valve whose open-close duty is adjustable may also be used as the switching valve 81.

As described, the hydraulic pressures of the hydraulic chambers 2c and 3c and the clutch C1 are changed by electrically controlling each pilot valve 26, 41, 60 and 73 to open and close each valve SLPA, SLPR, SLSA and SLSR. For this purpose, the hydraulic control unit is provided with an electronic control unit 82 serving as the controller, and in the following explanation, the electronic control unit will be called the "ECU" 82. The ECU 82 is configured to send command signals to the pilot valves 26, 41, 60 and 73 and the switching valve 81 while carrying out a calculation based on incident signals and preinstalled data and programs.

Here will be briefly explained an action of the hydraulic control unit HCU of the present invention thus structured. The hydraulic pressure delivered from the accumulator 11 is higher than that demanded by the hydraulic chamber 2c, therefore, such high-pressure fluid is applied to the input port 18 of the valve SLPA. As described, the input port 18 is connected to the back pressure port 22 via the connection passage 24 so that the high-pressure fluid is also applied to the back pressure port 22 if the pressure intensifier pilot valve 26 is opened. That is, in the valve SLPA, the pressure of the hydraulic chamber 16 is equal to that of the back pressure chamber 17. In this situation, the valve element 20 of the piston 15 is pushed onto the output port 19 by the spring 21 to close the valve SLPA, and the pressure of the hydraulic chamber 2c is applied to the output port 52 of the valve SLPR. As described, the input port 52 is connected to the back pressure port 56 via the connection passage 58. Therefore, given that the depressurization pilot valve 60 is closed, the pressure in the positive pressure chamber 51 is equalized to that of the back pressure chamber 51 of the valve SLPR so that the valve SLSR is closed.

The hydraulic pressure of the hydraulic chamber 2c of the drive pulley 2 is increased by electrically opening the pressure intensifier pilot valve 26 thereby providing a communication between the back pressure chamber 17 and the hydraulic chamber 2c. Since the pressure delivered from the accumulator 11 is higher than the hydraulic pressure of the hydraulic chamber 2c, the pressure in the back pressure chamber 17 of the valve SLPA is reduced by opening the pressure intensifier pilot valve 26. However, the control orifice 25 is formed on the connection passage 24 so that the hydraulic pressure in the hydraulic chamber 2c will not be lowered immediately. Consequently, the pressure in the hydraulic chamber 16 and the pressure in the back pressure chamber 17 are differentiated from each other. When such differential pressure exceeds the elastic force of the spring 21, the piston 15 is withdrawn while compressing the spring 21 so that the valve element 20 is isolated away from the output port 19 to provide a communication between the input port 18 and the output port 19. That is, the valve SLPA is opened. Consequently, the fluid is allowed to be delivered from the accumulator 11 to the hydraulic chamber 2c so that the hydraulic pressure in the hydraulic chamber 2c is increased.

The hydraulic pressure of the hydraulic chamber 2c of the drive pulley 2 is reduced by electrically opening the depressurization pilot valve 60 thereby providing a communication between the back pressure chamber 51 and the drain spot. In this case, the pressure in the back pressure chamber 51 of the valve SLPR is lowered. However, the control orifice 59 is formed on the connection passage 58 so that the hydraulic pressure in the positive pressure chamber 50 will not be lowered immediately. Consequently, the pressure in the positive pressure chamber 50 and the pressure in the back pressure chamber 51 are differentiated from each other. When such differential pressure exceeds the elastic force of the spring 55, the piston 49 is withdrawn while compressing the spring 55 so that the valve element 54 is isolated away from the output port 53 to provide a communication between the input port 52 and the output port 53. That is, the valve SLPR is opened. Consequently, the fluid is allowed to be drained from the hydraulic chamber 2c to the drain spot.

Figure 2:
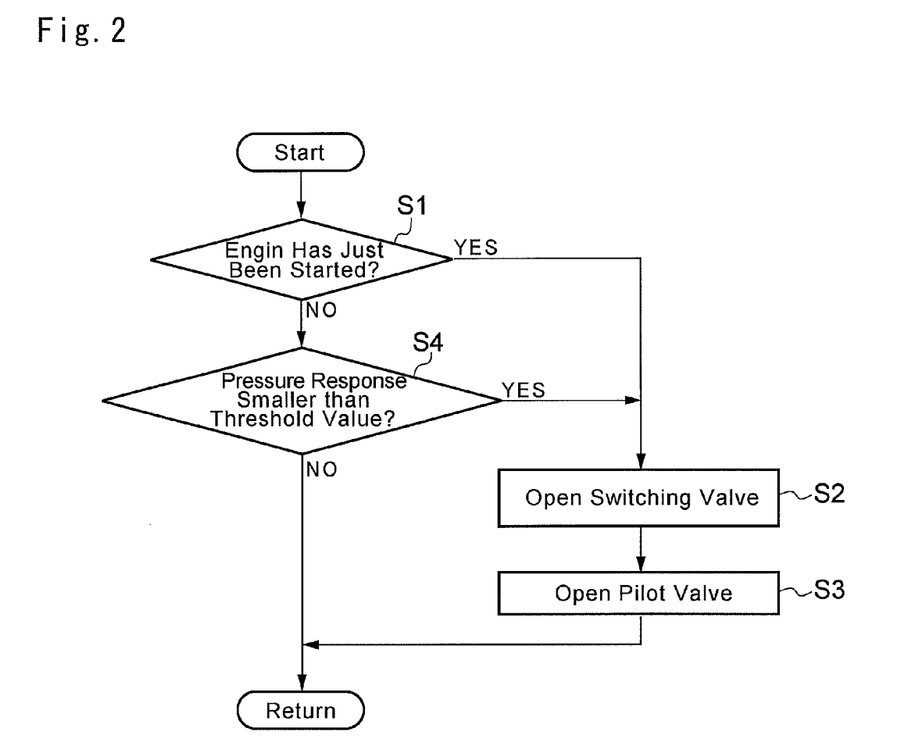
FIG. 2 is a flowchart showing one example of a hydraulic control carried out in the hydraulic control unit according to the present invention.

The hydraulic control unit HCU of the present invention performs the following controls given that air intrudes into each back pressure chamber 17, 32, 51 and 64 of the valve SLPA, SLPR, SLSA and SLSR. One example of the control is shown in FIG. 2. First of all, it is determined whether or not the engine 7 has just been started (at step S1). For example, the determination at step S1 is carried out by detecting an ignition confirmation signal from a not shown igniter for confirming that the engine 7 has been ignited, when starting the engine 7 to propel the stopping vehicle. In the case the ignition confirmation signal is detected, this means that the engine 7 has been started so that the oil pump 8 has already been started. Therefore, the oil pump 8 has started to deliver the fluid from an outlet thereof to the low pressure section LP.

If the answer of step S1 is YES, the switching valve 81 is opened (at step S2). Consequently, the low pressure section LP is communicated with each back pressure chamber 17, 32, 51 and 64 of each valve SLPA, SLPR, SLSA and SLSR. After or simultaneously with step S2, the pilot valves 26 41, 63 and 73 are energized to be opened (at step S3). Specifically, if the pressure intensifier pilot valve 26 is opened, the back pressure chamber 17 of the feeding valve SLPA is communicated with the back pressure chamber 51 of the drain valve SLPR, and if the depressurization pilot valve 60 is opened, the back pressure chamber 51 of the drain valve SLPR is communicated with the drain spot. That is, the fluid delivered from the oil pump 8 to the low pressure section LP is further delivered to the back pressure chamber 17 of the feeding valve SLPA via the bypass passage 75 until the hydraulic pressure is raised to a required level. The fluid delivered to the back pressure chamber 17 is further delivered to the back pressure chamber 51 of the drain valve SLPR via the control orifice 59. Meanwhile, the fluid in the low pressure section LP is also delivered to the back pressure chamber 51 of the drain valve SLPR via the bypass passage 75. The fluid thus delivered to the back pressure chamber 51 is drained to the drain spot together with the fluid delivered thereto from the back pressure chamber 17. As described, since the check valve 79 is disposed on the bypass passage 77, the fluid is prevented from flowing through the bypass passage 77 toward the low pressure section LP.

If the pressure intensifier pilot valve 41 is opened, the back pressure chamber 32 of the feeding valve SLSA is communicated with the back pressure chamber 64 of the drain valve SLSR, and if the depressurization pilot valve 73 is opened, the back pressure chamber 64 of the drain valve SLSR is communicated with the drain spot. Consequently, the fluid delivered from the oil pump 8 to the low pressure section LP is delivered to the back pressure chamber 32 of the feeding valve SLSA via the bypass passage 76. The fluid delivered to the back pressure chamber 32 is further delivered to the back pressure chamber 64 of the drain valve SLSR via the control orifice 72. Meanwhile, the fluid in the low pressure section LP is also delivered to the back pressure chamber 64 of the drain valve SLPR via the bypass passage 78. The fluid thus delivered to the back pressure chamber 64 is drained to the drain spot together with the fluid delivered thereto from the back pressure chamber 32. As described, since the check valve 80 is disposed on the bypass passage 78, the fluid is prevented from flowing through the bypass passage 78 toward the low pressure section LP.

If the engine 7 has been operated for a certain period of time so that the answer of step S1 is NO, it is determined whether or not a pressure response value that is a change in the hydraulic pressure in each back pressure chamber 17, 32, 51 and 64 with respect to an amount of the fluid discharged therefrom per unit of time is smaller than a predetermined threshold value (at step S4). Specifically, at step S4, it is determined whether or not quickness of an opening motion of the valve SLPA in response to a command for delivering the fluid to the hydraulic chamber 2c to raise the pressure therein is slower than a reference speed. To this end, the pressure response value may be obtained with reference to a preinstalled map where a pressure difference between the positive pressure chamber and the back pressure chamber in each valve, a current applied to the pilot valve 26, 41, 60 and 73, a delivery amount of the fluid to each hydraulic chamber 2c and 3c etc. are used as parameters. Alternatively, the determination at step S4 may also be made by determining whether or not the change in the pressure in each hydraulic chamber 2c and 3c in response to the command for increasing the pressure in each hydraulic chamber 2c and 3c is smaller than the threshold value, instead of determining the pressure change in the back pressure chamber.

If the pressure response value is smaller than the predetermined threshold value so that the answer of step S4 is YES, it is considered that air intrude into each back pressure chamber 17, 32, 51 and 64. Accordingly, the routine advances to step S2. By contrast, if the pressure response value is larger than the predetermined threshold value so that the answer of step S4 is NO, it is considered that air does not intrude into each back pressure chamber 17, 32, 51 and 64. In this case, therefore, the routine is returned while skipping steps S2 and S3.

Specifically, the pressure response value can be calculated by following formula:

$$\text{Pressure Response Value (MPa/sec)} = \text{Pressure (MPa/mL)} \cdot \text{Flow Rate (ml/sec)}$$

where "Pressure" is the hydraulic pressure in the back pressure chamber, and "Flow Rate" is an amount of the hydraulic fluid delivered to the hydraulic chamber 2c or 3c. For example, the hydraulic pressure in the valve SLPA is changed depending on a pressure receiving area of the piston 15, a travel distance of the piston 15, and an amount of air intrusion etc.

Figure 3:
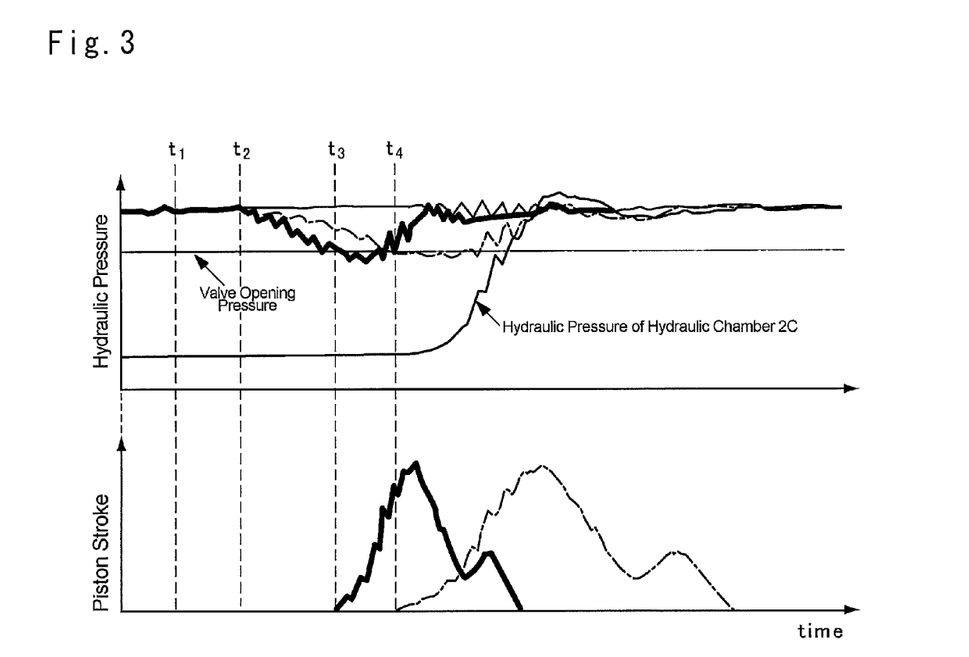
FIG. 3 is a time chart showing a change in the pressure in the back pressure chamber of the valve under the situation where the control shown in FIG. 2 is executed to increase a pressure in the hydraulic chamber.

Referring now to FIG. 3, there is shown a time chart indicating a change in the pressure in the back pressure chamber 17 of the feeding valve SLPA in case of increasing the pressure in the hydraulic chamber 2c after carrying out the foregoing controls. In FIG. 3, a solid line indicates a change in the hydraulic pressure in the back pressure chamber 17 after carrying out the control shown in FIG. 2, and a dotted dashed line indicates a change in the hydraulic pressure in the back pressure chamber 17 of a case in which the control shown in FIG. 2 is not carried out. As shown in FIG. 3, the engine 7 is at point $t_1$, and although not indicated, the switching valve 81 is opened upon reception of the ignition confirmation signal from the igniter. Then, at point $t_2$, the pressure intensifier pilot valve 26 is energized to be opened so that a communication between the back pressure chamber 17 and the hydraulic chamber 2c is provided. Consequently, since the pressure in the hydraulic chamber 2c is lower than the pressure applied from the accumulator 11, the pressure of the back pressure chamber 17 is lowered. However, since the fluid is delivered to the positive pressure chamber 16 from the accumulator 11, the pressure in the positive pressure chamber 16 is kept substantially constant. That is, step S3 shown in FIG. 2 is carried out at the point $t_2$.

At point $t_3$, the pressure in the back pressure chamber 17 is lowered to the pressure possible to open the feeding valve SLPA. That is, the pressure difference between the positive pressure chamber 16 and the back pressure chamber 17 exceeds the elastic force of the spring 21. Therefore, at point $t_3$, the piston 15 starts moving toward the back pressure chamber 17 so that the input port 18 is connected to the output port 19 in the positive pressure chamber 16. However, in case the control shown in FIG. 2 is not executed, the piston 15 starts moving towards the back pressure chamber 17 at point $t_4$. Thus, the feeding valve SLPA can be opened more quickly by carrying out the control shown in FIG. 2.

At point $t_3$ or immediately after point $t_3$, the above-mentioned differential pressure is relatively large so that the piston 15 is moved long distance. Then, when the pressure in the back pressure chamber 17 is increased by the fluid passing through the orifice 25 so that the pressure difference is reduced, the travel distance of the piston 15 is shortened. As shown in FIG. 3, a pressure rise in the hydraulic chamber 2c is inevitably delayed from the opening action of the feeding valve SLPA.

Thus, the air intrusion into the back pressure chambers 17, 32, 51 and 64 can be prevented or avoided by carrying out the hydraulic control of the present invention. In addition, since each back pressure chamber 17, 32, 51 and 64 can be filled with hydraulic fluid, an unintended opening of a valve can be prevented or avoided. Therefore, quickness of opening response of each valve SLPA, SLPR, SLSA and SLSR can be improved so that the control response of the hydraulic control system HCU can be improved.

Figure 4:
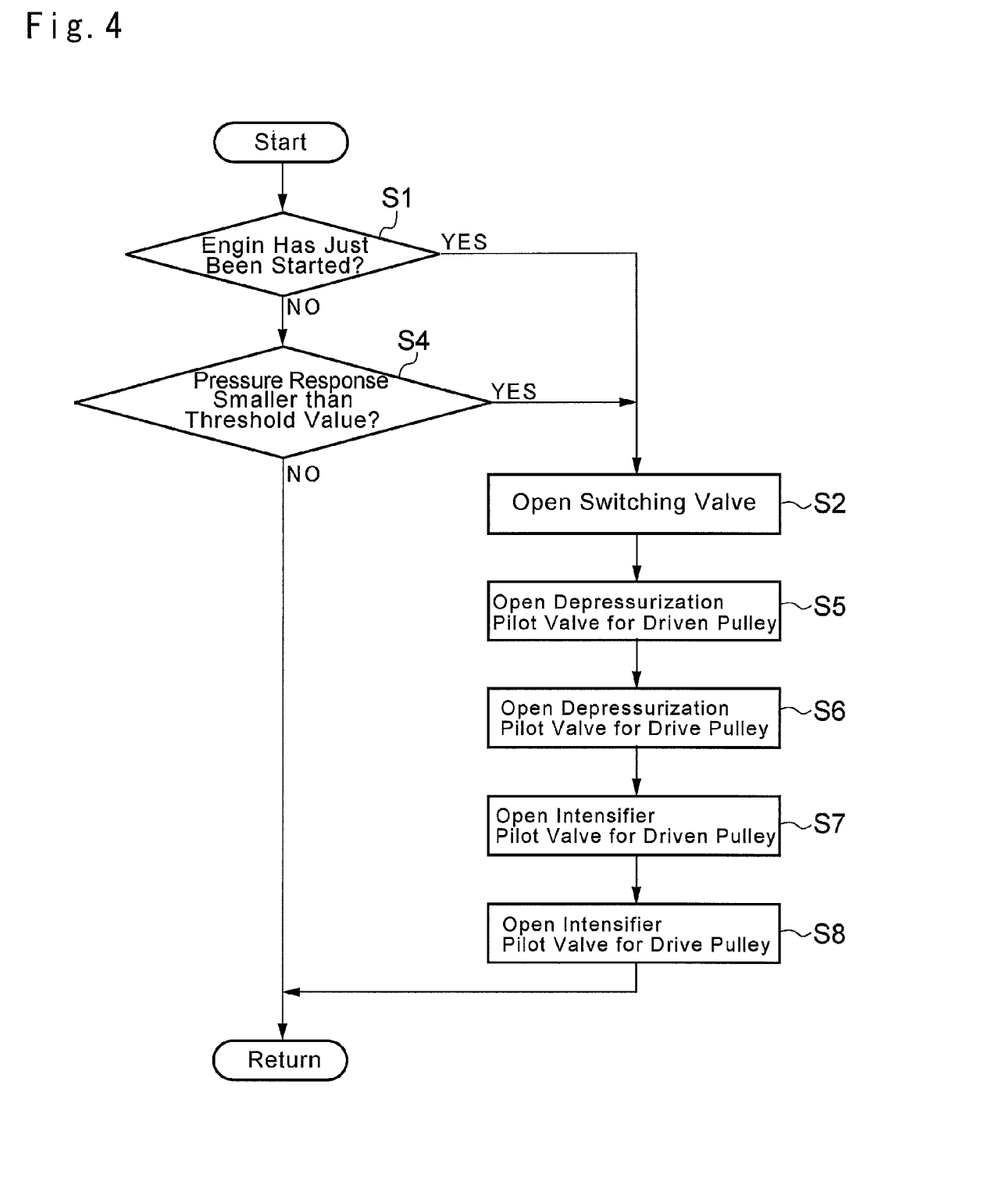
FIG. 4 is a flowchart showing another example of a hydraulic control carried out in the hydraulic control unit according to the present invention.

In the example shown in FIG. 2, the hydraulic fluid in the low pressure section LP is concurrently delivered to each back pressure chamber 17, 32, 51 and 64. Therefore, a shortage in the hydraulic fluid delivered to each back pressure chamber 17, 32, 51 and 64 may be caused. In order to prevent such shortage in the delivery amount of the fluid, as shown in FIG. 4, an order of energizing the pilot valves 26, 41, 60 and 74 may be determined thereby delivering the fluid from the low pressure section LP to the back pressure chamber 17, 32, 51 and 64 in the determined order. Here, in the flowchart of FIG. 4, common numbers are allotted to the steps identical to those in FIG. 2.

As can be seen from FIG. 4, after step S2, the depressurization pilot valve 73 for the driven pulley 3 is energized to be opened so that the fluid is delivered from the low pressure section LP to the back pressure chamber 64 of the drain valve SLSR via the bypass passage 78 (at step S5). Thereafter, the depressurization pilot valve 60 for the drive pulley 2 is energized to be opened so that the fluid is delivered from the low pressure section LP to the back pressure chamber 51 of the drain valve SLPR via the bypass passage 77 (at step S6). Thereafter, the intensifier pilot valve 41 for the driven pulley 3 is energized to be opened so that the fluid is delivered from the low pressure section LP to the back pressure chamber 32 of the feeding valve SLSA via the bypass passage 76 (at step S7). Thereafter, the intensifier pilot valve 26 for the drive pulley 2 is energized to be opened so that the fluid is delivered from the hydraulic fluid in the low pressure section LP to the back pressure chamber 17 of the feeding valve SLPA via the bypass passage 75 (at step S8). Thus, in the valves SLPA, SLPR, SLSA, SLSR, the fluid is delivered from the low pressure section LP most preferentially to the back pressure chambers 51 and 64 of the drain valves SLPR and SLSR, and second preferentially to the back pressure chambers 32 and 64 of the valves SLSA and SLSR for the driven pulley 3.

Thus, according to the control shown in FIG. 4, the back pressure chamber 17, 32, 51 and 64 can be filled certainly with the fluid delivered thereto so that the air intruded therein can be pushed out certainly by the fluid. Therefore, it is possible to prevent a belt slip caused by a delay in a pressure rise in the hydraulic chamber 3c resulting from delay in an opening action of the feeding valve SLSA for the driven pulley 3.

In addition, even if a leakage of the fluid from the accumulator 11 or the input pressure sensor 27 occurs, the hydraulic fluid may also be delivered to the hydraulic chamber 2c of the drive pulley 2 and to the hydraulic chamber 3c of the driven pulley 3 through the bypass passage 75, 76, 77 and 78 without passing through the accumulator 11 and the input pressure sensor 27. For this reason, the vehicle can be propelled certainly even if the aforementioned leakage occurs.

Here will be briefly explained a relation between the foregoing examples and the present invention. A functional means of steps S2 and S3 serve as the means that delivers hydraulic fluid from the low pressure section to the back pressure chamber if an opening motion of the valve is slower than a predetermined reference value, by opening the pilot valve to connect the back pressure chamber to the low pressure section.

The invention claimed is:

1. A hydraulic control unit, comprising:
   a valve comprising a piston integrated with a valve element, a cylinder holding the piston while allowing to reciprocate axially, a positive pressure chamber which is formed on one side of the piston and to which hydraulic pressure to open the valve is applied, a back pressure chamber which is formed on the other side of the piston and to which the hydraulic pressure to close the valve is applied, and a connection passage having a function to differentiate hydraulic pressures in the positive pressure chamber and the back pressure chamber;
   a pilot valve that selectively connects the back pressure chamber with a site where the pressure is lower than that of the back pressure chamber;
   a low pressure section to which the hydraulic pressure lower than that applied to positive pressure chamber is applied; and
   a controller configured to deliver hydraulic fluid from the low pressure section to the back pressure chamber through a bypass passage if an opening motion of the valve is slower than a predetermined reference value, by opening the pilot valve to allow the hydraulic fluid to be drained from the back pressure chamber to the site where the pressure is lower than that of the back pressure chamber.

2. The hydraulic control unit as claimed in claim 1, further comprising:
   a prime mover; and
   wherein said controller is further configured to deliver the hydraulic fluid from the low pressure section to the back pressure chamber through the bypass passage if the prime mover is started, by opening the pilot valve to allow the hydraulic fluid to be drained from the back pressure chamber to the site where the pressure is lower than that of the back pressure chamber.

3. The hydraulic control unit as claimed in claim 1, wherein the pilot valve is adapted to selectively connect a pilot port of the back pressure chamber to the site where the pressure is lower;
   wherein the bypass passage directly connects the back pressure chamber to the low pressure section, and a cross-sectional area thereof is larger than that of a portion of the connection passage to differentiate the hydraulic pressures, wherein the hydraulic control unit further comprises a switching valve that is disposed on the bypass passage to selectively connect the bypass passage with the low pressure section; and wherein said controller is further configured to connect the bypass passage with the low pressure section to deliver the hydraulic fluid from the low pressure section to the back pressure chamber if the opening motion of the valve is slower than the predetermined reference value, by opening pilot valve while operating the switching valve to allow the hydraulic fluid to be drained from the back pressure chamber to the site where the pressure is lower than that of the back pressure chamber.

4. The hydraulic control unit as claimed in claim 1, wherein the positive pressure chamber is comprised of an input port to which the fluid to open the valve is delivered, and an output port which is closed by the valve element; and wherein the switching valve is disposed between a hydraulic chamber of a pulley of a belt-driven continuously variable transmission and a hydraulic source, and the output port is connected with the hydraulic chamber.

5. The hydraulic control unit as claimed in claim 2, wherein the pilot valve is adapted to selectively connect a pilot port of the back pressure chamber to the site where the pressure is lower;

wherein the bypass passage directly connects the back pressure chamber to the low pressure section, and a cross-sectional area thereof is larger than that of a portion of the connection passage to differentiate the hydraulic pressures, wherein the hydraulic control unit further comprises a switching valve that is disposed on the bypass passage to selectively connect the bypass passage with the low pressure section; and wherein said controller is further configured to connect the bypass passage with the low pressure section to deliver the hydraulic fluid from the low pressure section to the back pressure chamber if the opening motion of the valve is slower than the predetermined reference value, by opening pilot valve while operating the switching valve to allow the hydraulic fluid to be drained from the back pressure chamber to the site where the pressure is lower than that of the back pressure chamber.

6. The hydraulic control unit as claimed in claim 2, wherein the positive pressure chamber is comprised of an input port to which the fluid to open the valve is delivered, and an output port which is closed by the valve element; and wherein the switching valve is disposed between a hydraulic chamber of a pulley of a belt-driven continuously variable transmission and a hydraulic source, and the output port is connected with the hydraulic chamber.

7. The hydraulic control unit as claimed in claim 3, wherein the positive pressure chamber is comprised of an input port to which the fluid to open the valve is delivered, and an output port which is closed by the valve element; and wherein the switching valve is disposed between a hydraulic chamber of a pulley of a belt-driven continuously variable transmission and a hydraulic source, and the output port is connected with the hydraulic chamber.

8. The hydraulic control unit as claimed in claim 5, wherein the positive pressure chamber is comprised of an input port to which the fluid to open the valve is delivered, and an output port which is closed by the valve element; and wherein the switching valve is disposed between a hydraulic chamber of a pulley of a belt-driven continuously variable transmission and a hydraulic source, and the output port is connected with the hydraulic chamber.

* * * * *